Figure 1:
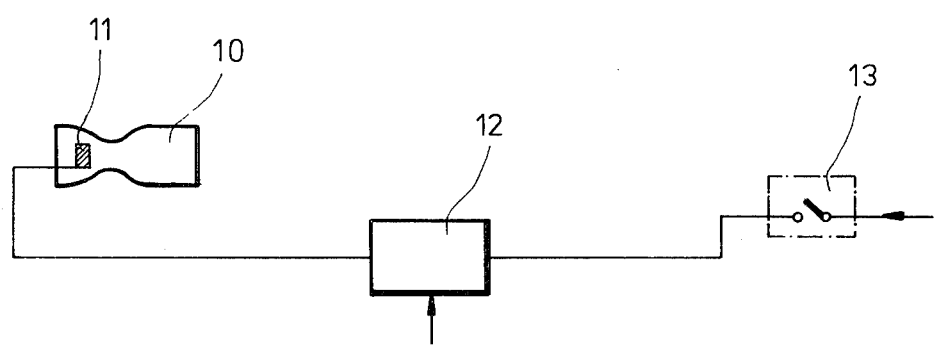

United States Patent [19]

Schwaerzler

[11] 4,445,653

[45] May 1, 1984

[54] METHOD FOR THE LANDING OF AIR AND SPACECRAFTS

[75] Inventor: Hans Schwaerzler, Taufkirchen, Fed. Rep. of Germany

[73] Assignee: Messerschmitt-Boelkow-Blohm Gesellschaft mit beschraenkter Haftung, Munich, Fed. Rep. of Germany

[21] Appl. No.: 251,894

[22] Filed: Apr. 7, 1981

[30] Foreign Application Priority Data

Apr. 2, 1980 [DE] Fed. Rep. of Germany ....... 3012789

[51] Int. Cl.³ .............................................. B64D 17/80
[52] U.S. Cl. ................................ 244/110 D; 244/113; 244/139
[58] Field of Search ............... 244/110 R, 110 D, 113, 244/12.4, DIG. 1, 139, 110 B

[56] References Cited

U.S. PATENT DOCUMENTS

| | | | |
|---|---|---|---|
| 2,422,744 | 6/1947 | O'Neil | 244/110 B |
| 3,089,667 | 5/1963 | Gosslau et al. | 244/12.4 |
| 3,339,866 | 9/1967 | Paluka et al. | 244/113 |
| 3,719,256 | 3/1973 | Clark | 244/110 B |
| 3,931,944 | 1/1976 | Capewell et al. | 244/110 B |

OTHER PUBLICATIONS

Johnson, "Low-Subsonic Flight Chara. of a Model of a Supersonic-Airplane Config., with a Parawing as a Landing Aid," *NASA TN D*-2031, 1963.
"Aerodynamic Chara. of the Parafoil Glider and Other Gliding Parachutes", *RTD-TDR*-63-4022, 1964.

*Primary Examiner*—Galen L. Barefoot
*Attorney, Agent, or Firm*—W. G. Fasse; D. H. Kane, Jr.

[57] ABSTRACT

An aircraft or spacecraft is landed with the aid of a paraglider type parachute and with a braking booster rocket which emits its jet in the landing direction. The glide number of the paraglider is selected to provide the craft for the landing with an extremely "inefficient" glide number so that the ratio of drag to lift is about 1. Thus, the total drag of the combination paraglider and craft corresponds about to the maximum forward thrust of the craft, whereby a pinpoint landing may be accomplished.

4 Claims, 2 Drawing Figures

METHOD FOR THE LANDING OF AIR AND SPACECRAFTS

CROSS REFERENCE TO RELATED APPLICATION

The present application corresponds to German patent application No. P 3,012,789.0, filed to the Federal Republic of Germany on Apr. 2, 1980. The priority of said German Patent Application is hereby expressly claimed.

BACKGROUND OF THE INVENTION

The invention relates to a method for landing a flying or air or spacecraft on a runway or landing strip with the assistance of a gliding parachute or paraglider.

Such methods have become known as such and these methods utilize, without exception, auxiliary landing devices constructed to have a relatively good gliding number while attaining high lift. These methods have a series of drawbacks. In this way, the braking force occurs only at a time delay after the landing or touchdown point, which influences the safety on wet runways, especially since the stabilization about the yaw and roll axes of the flying craft is affected.

OBJECT OF THE INVENTION

It is the object of the present invention to provide a landing procedure of the initially named type which eliminates the above mentioned drawbacks and which has a considerably higher deceleration and among other things, also allows an almost pinpoint landing of a flying craft.

SUMMARY OF THE INVENTION

One example embodiment of the invention is described and illustrated in the following, whereby the solution characterizations are set forth in the claims.

BRIEF FIGURE DESCRIPTION

Figure 2:
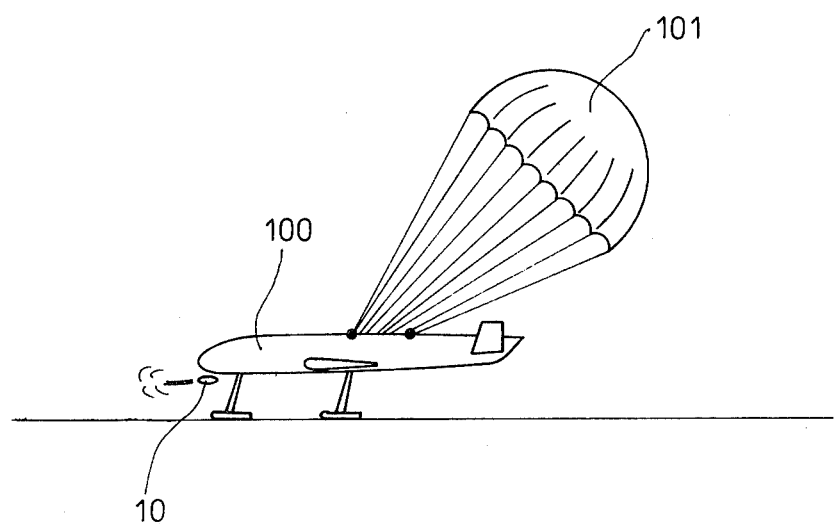

The FIG. 1 of the drawings shows, in a schematic manner, the block diagram of the circuit for igniting the present booster at the correct speed; and FIG. 2 is a sketch of the airplane with a paraglider attached for practicing the present landing method.

DETAILED DESCRIPTION OF PREFERRED EXAMPLE EMBODIMENTS AND OF THE BEST MODE OF THE PRESENT INVENTION

In contrast to the heretofore usual aerodynamic constructions of landing devices according to the prior art, namely the realization of a relatively good glide number (drag-lift ratio) at high lift, the invention provides for the exact opposite, namely utilizing a paraglider as a landing device which imparts an extremely unfavorable glide number to the flying craft or body. This draglift ratio should approximately correspond to the value of $D/L \approx 1$, wherein "D" denotes drag and "L" denotes lift. That is, an aerodynamic construction is chosen for the paraglider used as a landing device in which the drag of the combination of the flying craft or body and of the paraglider corresponds approximately to the maximum thrust of the propulsion. The chosen paraglider in combination with the propulsion of the flying craft in the present landing procedure, has the required lift for the landing approach as well as a high drag for deceleration on the landing strip after the engine propulsion has been shut off at the touchdown point. The auxiliary landing device, in this case the chosen paraglider, is hereby already activated during the landing approach, so that after the touchdown, no further control of its function is required. A paraglider with an extremely unfavorable glide number (drag-lift ratio) has been chosen as an auxiliary lift device, which imparts a high braking force to the flying craft or body directly after touchdown in this particular phase in which other braking arrangements are not yet even in operation. The size of the paraglider and the landing velocity of the flying craft or body are, as already mentioned, chosen so that the drag of the combination of the flying craft or body and of the paraglider corresponds to the maximum thrust of the propulsion, or at least it corresponds substantially thereto. Hence, the general difference between the present landing method and those of the prior art becomes clear, since the latter require a reduced thrust for the landing approach whereas according to the teaching of the invention the landing approach requires a very high thrust.

Furthermore, the landing method according to the invention provides for a braking booster 10 (propelling-charge container) of a short braking duration, especially for simple flying craft or bodies 100. This booster 10 serves to decelerate the flying craft or body until its standstill in a velocity range prior to standstill in which the braking action of the paraglider 101 is only small. Thus, the booster 10 is ignited at a point of time after touchdown when the flying craft or body retains only approximately 25% of its original energy or speed. The construction of the booster 10 can therefore be very small and light. Its activation, or rather its firing, is accomplished by a functional part of the flying craft or body, the landing gear in the given example, by means of a switch 13. This switch 13 is actuated at the time of touchdown of the flying craft or body by the spring-response of the landing gear. A time delay device 12 is operatively interposed between the ignition 11 in the booster 10 and the landing gear switch 13, which trigger the ignition 11 after the craft or body has reached a preset or desired reduced velocity as determined by the delay device. This simple procedure of using a time delay device 12 is possible according to the invention because the velocity reduction is directly dependent on or proportional to the braking time achieved with the paraglider. The braking time is the time between touchdown and stopping.

A mechanical time clock may, for example, be utilized as the time delay device 12, which is set into operation by means of an electrical impulse at the arrow input of the time delay device 12. This impulse may be produced by a landing gear switch not shown. The time delay device 12 then actuates an ignition switch after a set delay time has elapsed for triggering the ignition 11 in the booster 10 without any further time delay after the set delay time.

An electronic analog or digital microchronometer may be used for the time delay device 12. This microchronometer would be activated, as mentioned above, by an impulse generated at the time of touchdown. After the specified time delay has elapsed the microchronometer actuates an ignition switch (not illustrated) which triggers the ignition 11 in the booster 10.

The drawbacks of the known methods are reliably and optimally eliminated by the suggested landing method. The safety during deceleration on wet runways is completely assured, the braking force of the paraglider 101 is completely operative at the touchdown point without any time delay. The completion of an almost pinpoint landing may be realized, and in addition, a considerably higher deceleration is provided.

Since the landing operatio comprises but a few follow-up functions, the total expenditure has been reduced while the reliability has been considerably increased. Furthermore, the stabilization of the flying device during deceleration about the yaw and roll axes has been improved. The fact is further expecially to be emphasized that a landing executed according to the invention substantially decreases the previous repair expenditures since the damage done to the air frame has been considerably reduced and the maintenance time of the flying craft or body has been considerably shortened.

Although the invention has been described with reference to specific example embodiments, it will be appreciated that it is intended to cover all modifications and equivalents within the scope of the appended claims.

I claim:

1. A method for landing an aircraft or spacecraft by means of a paraglider and a braking thrust booster, comprising the following steps: providing the craft with a paraglider having a drag (D) to lift (L) ratio D/L corresponding substantially to one, providing the craft with propulsion means developing a given maximum thrust, constructing the craft and paraglider combination so that the drag of the combination corresponds to said given maximum thrust at least during a specific phase of a landing operation when the propulsion is at said maximum thrust, activating the paraglider to a deployed position having a drag to lift ratio corresponding substantially to one during the landing approach shortly before touchdown, and activating the braking thrust booster for cooperation with said paraglider only during a terminal braking phase of a landing operation.

2. The method of claim 1, wherein said activating of said braking thrust booster is performed in response to a predetermined time delay following touchdown of the craft.

3. The method of claim 2, wherein said time delay is determined by means of a mechanical microchronometer which is activated at touchdown and which then causes the ignition of the braking thrust booster after said predetermined time delay has elapsed.

4. The method of claim 2, wherein said time delay is determined by means of an electronic analog or digital chronometer which is activated at touchdown and which then causes the ignition of the braking thrust booster after said predetermined time delay has elapsed.

* * * * *